United States Patent [19]
Bannister et al.

[11] Patent Number: 5,953,900
[45] Date of Patent: Sep. 21, 1999

[54] CLOSED LOOP STEAM COOLED STEAM TURBINE

[75] Inventors: Ronald L. Bannister, Winter Springs, Fla.; Richard Allen Newby, Pittsburgh, Pa.

[73] Assignee: Siemens Westinghouse Power Corporation, Orlando, Fla.

[21] Appl. No.: 08/715,773

[22] Filed: Sep. 19, 1996

[51] Int. Cl.$^6$ .................................. F02C 3/24; F02C 3/30

[52] U.S. Cl. .................... 60/39.05; 60/39.17; 60/39.465; 60/39.55

[58] Field of Search ............... 60/39.05, 39.17, 60/39.182, 39.465, 39.54, 39.55, 39.75

[56] References Cited

U.S. PATENT DOCUMENTS

| | | | |
|---|---|---|---|
| 2,602,289 | 7/1952 | Anxionnaz et al. | 60/39.465 |
| 3,238,719 | 3/1966 | Harslem . | |
| 3,328,957 | 7/1967 | Rose | 60/39.05 |
| 3,978,661 | 9/1976 | Cheng . | |
| 4,148,185 | 4/1979 | Somers | 60/39.17 |
| 4,424,668 | 1/1984 | Mukherjee | 60/39.182 |
| 5,170,622 | 12/1992 | Cheng | 60/39.05 |
| 5,331,806 | 7/1994 | Warkentin | 60/39.465 |
| 5,412,937 | 5/1995 | Tomlinson et al. | 60/39.02 |
| 5,491,971 | 2/1996 | Tomlinson et al. | 60/39.182 |
| 5,613,356 | 3/1997 | Frutschi | 60/39.182 |

FOREIGN PATENT DOCUMENTS

| | | |
|---|---|---|
| 2237492 | 7/1995 | France . |
| WO97/31184 | 8/1997 | WIPO . |

OTHER PUBLICATIONS

Nedo, "International Clean Energy Network Using Hydrogen Conversion" (1993).

Bannister, et al., "A Hydrogen–Fueled Combustion Turbine Designed for Greater Than 60% (HHV) Efficiency", Canadian Electrical Association (Apr., 1996).

Bannister, et al., "Hydrogen–Fueled Combustion Turbine Cycles", International Gas Turbine and Aeroengine Congress & Exhibition, (Jun. 10–13, 1996).

S.P. Malyshenko et al, "Thermodynamic Aspects of the Use of Hydrogen for Solving Certain Problems Facing the Power Industry", *Thermal Engineering*, 33 (10), 1986, pp. 553–557.

Patent Abstracts of Japan, vol. 011, No. 263 (M–619), Aug. 1987 & JP 62 067239A, Mar. 26, 1987.

*Primary Examiner*—Louis J. Casaregola

[57] ABSTRACT

A power plant in which hydrogen and oxygen are combusted to produce a flow of high pressure, high temperature steam. The steam is expanded in a high pressure turbine employing closed steam loop cooling for the stationary vanes and rotating blades. A heat recovery steam generator produces the cooling steam by transferring heat from the expanded steam exhausting from the high pressure turbine to feed water. The cooling steam is directed through cooling passages formed in the vanes and blades of the turbine and the heated cooling steam is collected and returned to the cycle by directing it to the combustors where it serves to moderate temperature. Steam used to cool the intermediate and low pressure vanes and blades of the high pressure turbine is directed to an intermediate pressure turbine for cooling and expansion. An intermediate pressure combustor further heats the cooling steam prior to its expansion in the intermediate pressure turbine.

25 Claims, 3 Drawing Sheets

CLOSED LOOP STEAM COOLED STEAM TURBINE

BACKGROUND OF THE INVENTION

The present invention relates to a turbine for use in a power plant using hydrogen and oxygen as the fuel. More specifically, the present invention relates to a closed loop steam cooled turbine in which steam, generated by the combustion of hydrogen and oxygen, is expanded for power generation.

A gas turbine is typically comprised of a compressor section that produces compressed air, a combustion section that transforms the compressed air into a hot, compressed gas, and a turbine section that expands the hot, compressed gas. In the combustion section, a hydrocarbon fuel, such as distillate oil or natural gas, is mixed with and burned in the compressed air in one or more combustors. Unfortunately, such combustion results in the formation of oxides of nitrogen ("NOx"), considered an atmospheric pollutant.

Combusting hydrogen in pure oxygen would eliminate all NOx formation. Combustors for rocket engines have traditionally operated by combusting liquid hydrogen in liquid oxygen. However, power turbines must operate for extended periods of time without deterioration. Consequently, the problems of cooling the combustor in a gas turbine presents challenges not present in rocket combustors. This problem is exacerbated if, for reasons of economy and ease of handling and supply, compressed oxygen gas, rather than liquid oxygen, is used. Typically, rocket combustors rely on the low temperature of liquid oxygen for cooling.

Cooling of the turbine section would also be a problem in a hydrogen/oxygen fueled power plant, especially since it is desirable to operate the turbine with inlet temperatures as high as 900 to 1600° C. in order to achieve optimum power output. The air cooling traditionally used in combustion turbines negatively impacts the efficiency of the power plant.

It is, therefore, desirable to provide a system for cooling the vanes and blades of a turbine expanding steam generated by the combustion of hydrogen and oxygen.

SUMMARY OF THE INVENTION

Accordingly, it is the general object of the current invention to provide a system for effectively and efficiently cooling the vanes and blades of a turbine expanding steam generated by the combustion of hydrogen and oxygen.

Briefly, this object, as well as other objects of the current invention, is accomplished in a method of generating rotating shaft power, comprising the steps of (i) combusting a first flow of hydrogen and a first flow of oxygen, thereby producing a first flow of steam, (ii) at least partially expanding the first flow of steam in a first turbine so as to produce shaft power and a flow of expanded steam, the first turbine having a plurality of components therein over which the first flow of steam flows, whereby heat is transferred from the first flow of steam to the components, (iii) transferring heat from the flow of expanded steam to a flow of feed water so as to generate a flow of cooling steam, (iv) directing at least a first portion of the flow of cooling steam through at least a first portion of the turbine components and transferring heat from the first portion of the turbine components to the first portion of the flow of cooling steam, thereby generating a first flow of heated cooling steam, and (v) mixing with the first flow of heated cooling steam with the first flow of steam.

The invention also encompasses a power plant, comprising (i) a combustor having means for receiving and combusting a flow of hydrogen and flow of oxygen so as to produce a first flow of steam, (ii) a first turbine having means for expanding the first flow of steam so as to produce a flow of expanded steam, the expanding means including a plurality of components over which the first flow of steam flows and to which the first flow of steam transfers heat, (iii) means for transferring heat from the flow of expanded steam to a flow of feed water so as to generate a second flow of steam, (iv) means for directing at least a first portion of the second flow of steam through at least a first portion of the turbine components and for transferring heat from the first portion of the turbine components to the first portion of second flow of steam, thereby generating a first flow of heated steam, and (v) means for directing the first flow of heated steam to the combustor for mixing with the first flow of steam.

DESCRIPTION OF THE PREFERRED EMBODIMENT

Figure 1:
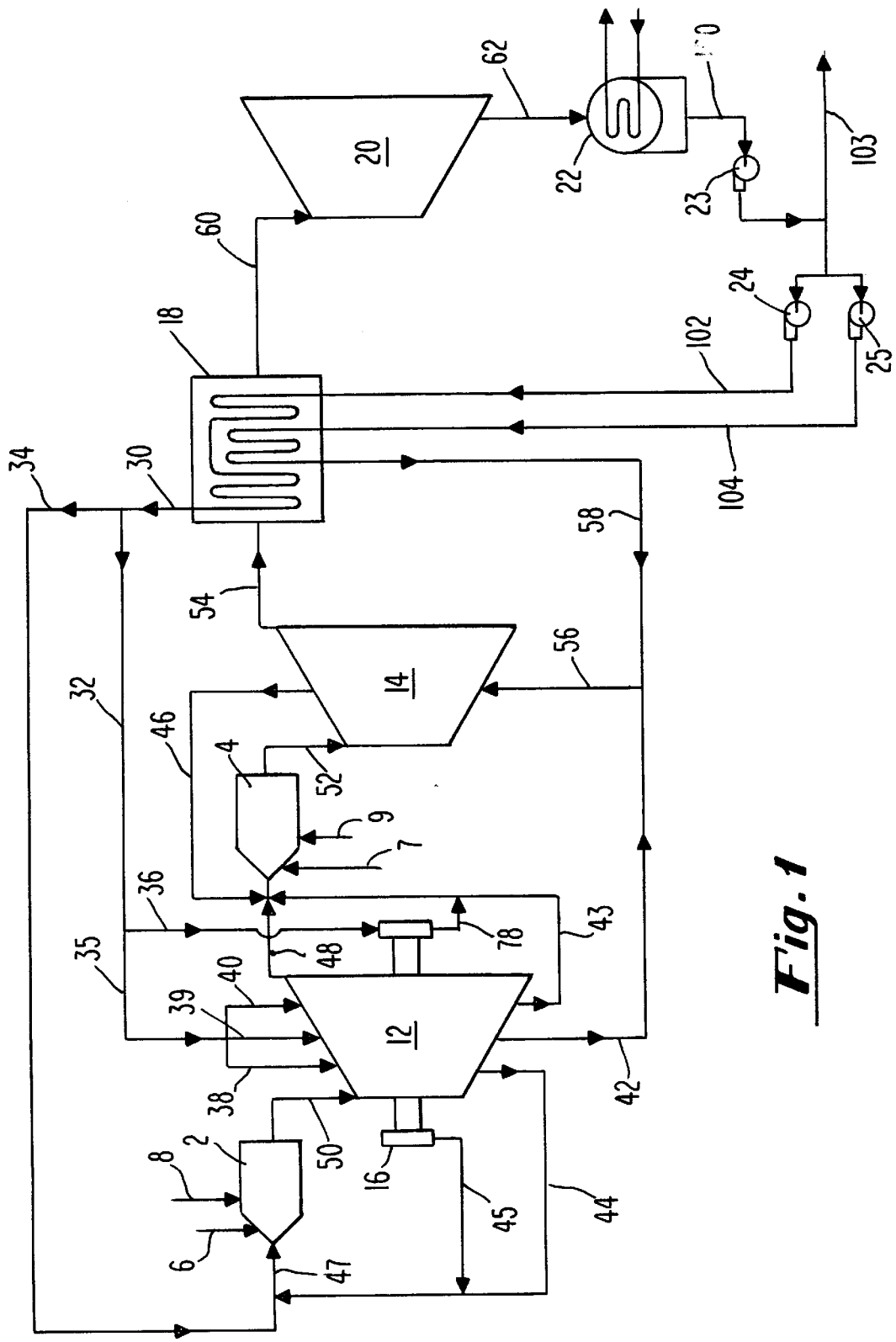
FIG. 1 is a schematic diagram of a hydrogen/oxygen fueled power plant employing the closed loop steam cooled high and intermediate pressure turbines according to the current invention.

Referring to the drawings, there is shown in FIG. 1 a hydrogen fueled power plant. The major components of the plant are a high pressure combustor 2, a high pressure steam turbine 12 through which a rotor 16 extends, an intermediate pressure combustor 4, and intermediate pressure steam turbine 14, a heat recovery steam generator 18, a low pressure steam turbine 20, and a condenser 22. As is typical, each of the turbines drives a load, such as an electrical generator (not shown).

In operation, hydrogen 6 and oxygen 8, which may be in either gaseous or liquid—i.e., cryogenic—form, are supplied to the high pressure combustor 2. If the hydrogen 6 and oxygen 8 are in gaseous form, compressors may be utilized to further pressurized the gas. In the high pressure combustor 2, the hydrogen 6 and oxygen 8 combust to form high temperature, high pressure steam. Preferably, the combustion takes place at close to stoichiometric conditions so that the combustor 2 discharges essentially pure steam. A supply of temperature moderating steam 47, generated as discussed below, is also supplied to the high pressure combustor 2. The temperature moderating steam 47 mixes with the steam produced by the combustion of the hydrogen 6 and oxygen 8, thereby cooling it and preventing overheating of the combustor 2 components. Preferably, the steam mixture 50 discharged from the high pressure combustor 2 is about 1600 ° and 250 bar.

From the high pressure combustor 2, the steam 50 is directed to the high pressure steam turbine 12, which is discussed in detail below. In the high pressure steam turbine 12, the steam 50 is partially expanded, thereby producing shaft power in the rotor 16. Preferably, the steam 48 discharged from the high pressure turbine 12 has been expanded to 935° C. and 25 bar. The steam 48 is then mixed with three streams of temperature moderating steam 43, 46, and 78. Steam 43 has been heated in the process of cooling the intermediate pressure rows of vanes in the high pressure turbine 12, as discussed further below. Steam 46 has been heated in the process of cooling the intermediate pressure turbine 14. Steam 78 has been heated in the process of cooling the low pressure rows of blades in the high pressure turbine 12, as discussed further below.

Additional hydrogen 7 and oxygen 9 are combusted in the intermediate pressure combustor 4. Despite their having absorbed heat from the turbines 12 and 14, the steam flows 43, 46, and 78 are nevertheless cooler than the steam produced by the combustion of hydrogen 7 and oxygen 9 in the intermediate pressure combustor 4. Thus, steam streams 43, 48, 78, and 46 are directed to the intermediate pressure combustor 4 and serve to moderate temperature and cool the combustor. Preferably, the steam 43 and 46 is approximately 650° C.

The heated steam 52 discharged from the intermediate combustor 4 is then directed to the intermediate steam turbine 14. Preferably, the steam 52 has been heated in the combustor 4 to approximately 1600° C. In the intermediate pressure turbine 14, the steam 52 is further expanded, thereby producing additional shaft power. Preferably, the steam 54 discharged from the intermediate pressure turbine 14 has been expanded to approximately 840° C. and 1 bar.

The steam 54 from the intermediate turbine 14 is then directed to a hear recovery steam generator 18, where a portion of its heat is transferred to two streams of feed water 102 and 104, thereby generating two streams of steam 30 and 58. Preferably, sufficient heat is transferred in the heat recovery steam generator 18 so that the steam 60 discharged therefrom has been cooled to approximately 110° C. From the heat recovery steam generator 18, the cooled steam 60 is directed to a low pressure turbine 20, where it is further expanded to produce still more shaft power. Preferably, the steam 62 discharged from the low pressure turbine 20 has been expanded to approximately 33° C. and 0.05 bar. The expanded steam 62 is then condensed in a condenser 22.

The condensate 100 drawn from the condenser 22 by pump 23 is split into three steams, the first and second of which are directed to feed pumps 24 and 25, respectively. The third stream 103 is bleed from the cycle, as discussed below. Feed pump 24 boosts the pressure of a portion of the condensate 100, preferably to a pressure in excess of 300 bar, and directs the high pressure feed water 102 to the heat recovery steam generator 18 where, as previously discussed, it absorbs heat from the steam 54 discharged by the intermediate pressure turbine 14. Preferably, sufficient heat is transferred to heat the high pressure steam 30 discharged from the heat recovery steam generator 18 to approximately 400° C. Feed pump 25 boosts the pressure of the second condensate stream to an intermediate pressure and directs the intermediate pressure feed water 104 to the heat recovery steam generator 18 where it is converted to intermediate pressure steam 58. Preferably, intermediate steam 58 is approximately 375° C. and 30 bar.

The high pressure steam 30 from the heat recovery steam generator 18 is split into two streams 32 and 34. Steam 34 forms a portion of the temperature moderating steam 47 for the high pressure combustor 2, as previously discussed.

According to the current invention, steam 32 is further split into two streams 35 and 36, both of which are directed to the high pressure turbine 12 for cooling. The first stream of cooling steam 35 serves to cool the stationary vanes while the second stream of cooling steam 36 cools the rotor 16, as discussed further below. The vane cooling steam 35 is divided into three streams 38, 39, and 40. Steam streams 38, 39, and 40 serve to cool the high, intermediate and low pressure vanes of the high pressure turbine 12, respectively, and, in the process become further heated. After they perform their cooling function, steam streams 38, 39 and 40 are discharged from the turbine 12 as heated steam streams 44, 42, and 43, respectively. The high pressure vane cooling steam 44 that is discharged from the high pressure turbine 12 forms a second portion of the temperature moderating steam 47 supplied to the high pressure combustor 2.

The intermediate pressure vane cooling steam 42 that is discharged from the high pressure turbine 12 is combined with the intermediate pressure steam 58 produced by the heat recovery steam generator 18, as previously discussed. The combined flow of steam 56 is then directed to the intermediate pressure turbine 14 for cooling of the turbine components using the techniques discussed below with reference to the cooling of the high pressure turbine 12. From the intermediate pressure turbine 14, the cooling steam 46, which has preferably been heated to approximately 650° C., along with the high pressure turbine low pressure vane cooling steam 43, is combined with the steam 48 discharged from the high pressure turbine 12 so as to form the remainder of the temperature moderating steam for the intermediate pressure combustor 4.

The second stream of cooling steam 36 cools the blades of the high pressure turbine rotor 16, after which it is discharged from the rotor in two streams 78 and 45. Stream 78, which cooled the lower pressure blades of the high pressure turbine 12, is combined with the low pressure vane cooling steam 43, where it serves to moderate the temperature in the intermediate pressure combustor 4, as previously discussed. Stream 45, which cooled the high pressure blades of the high pressure turbine 12, is combined with the high pressure vane cooling steam 44 and forms the third portion of the temperature moderating steam 47 supplied to the high pressure combustor 2.

In the preferred embodiment, all of the cooling of the high pressure turbine 12 is accomplished by the steam 32, thereby providing a very thermodynamically efficient system. As can be seen, the cooling system is closed loop—that is, except for incidental leakages, all of the steam 32 supplied to the high pressure turbine 12 for cooling is returned to the cycle, along with heat absorbed during the cooling. Since hydrogen and oxygen are continually added to the system in the combustors 2 and 4, a portion 103 of the condensate 100 is continuously bleed from the system to maintain an equilibrium.

The details of the closed loop steam cooling for the high pressure steam turbine 12 will now be discussed with reference to FIGS. 2 and 3. The cooling of the stationary vanes will be discussed first.

Figure 2:
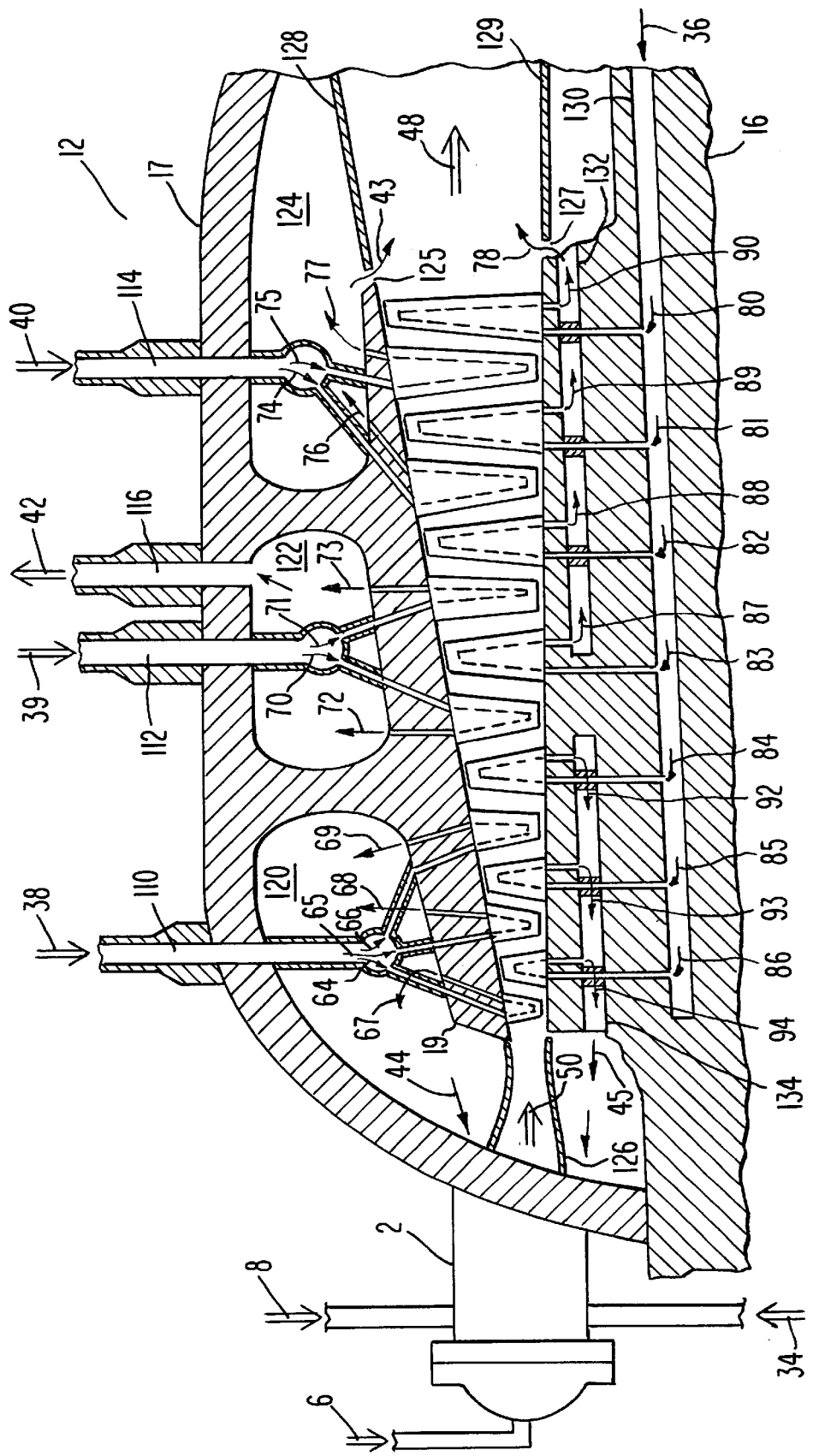
FIG. 2 is a longitudinal cross-section, partially schematic, through the high pressure turbine shown in FIG. 1.

As shown in FIG. 2, the high pressure turbine 12 is enclosed by an outer shell 17 that encloses an inner shell 19. The inner and outer shells 17 and 19 are connected by webs so as to form three plenums 120, 122 and 124 that serve to direct the flow of the cooling steam flows 38, 39 and 40, respectively. The high pressure combustors 2 are attached to the front end of the outer shell 17. Ducts 126 extend through plenum 120 and direct the flow of the steam 50 from the high pressure combustors 2 to the inlet of the turbine working fluid flow path.

Figure 3:
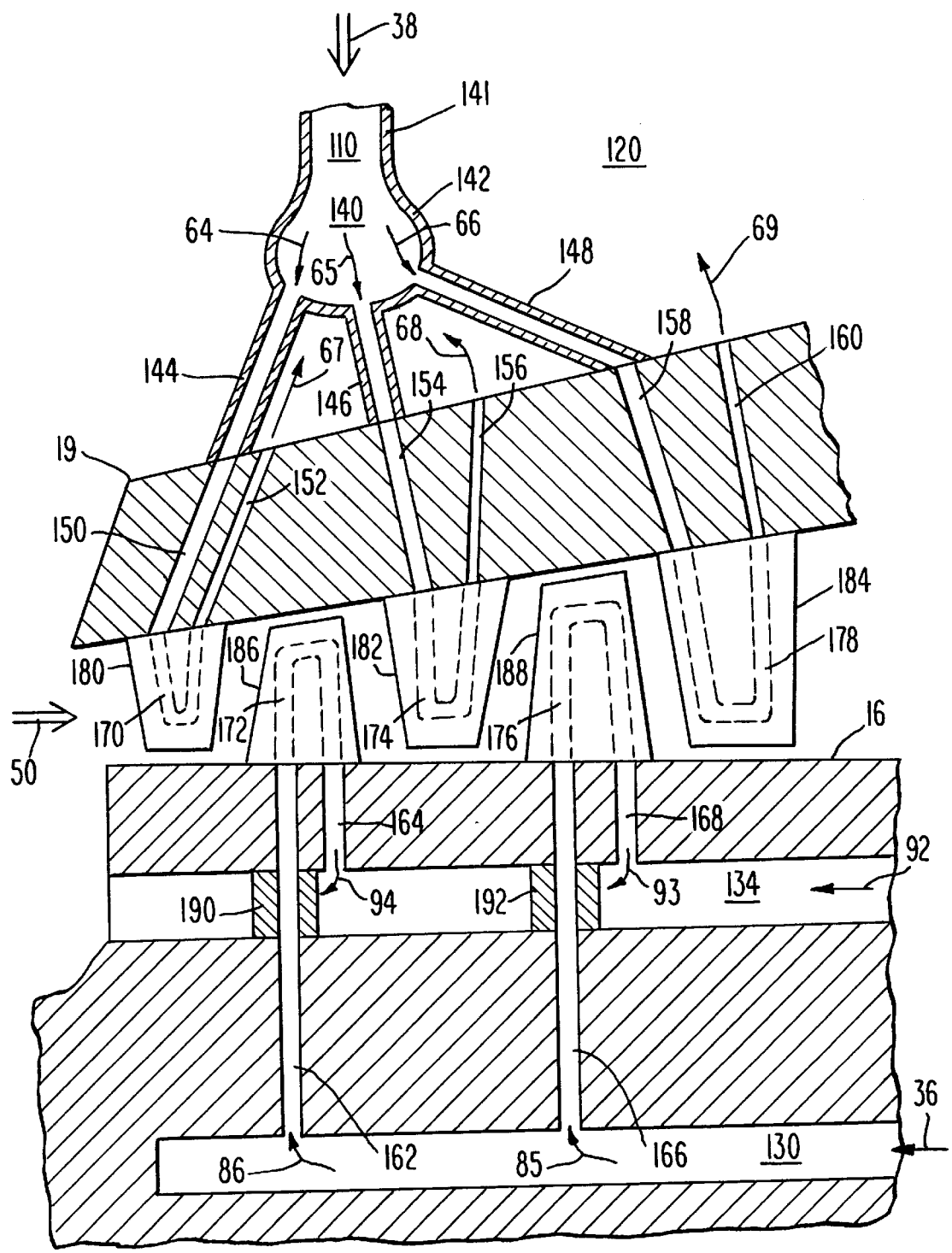
FIG. 3 is an enlarged view of FIG. 2 in the vicinity of the turbine inlet.

The high pressure vane cooling steam 38 enters the outer shell 17 through a passage 110 and is directed by a pipe 141 to a circumferentially extending pipe 142, as shown in FIG. 3. Pipe 142 forms a manifold 140 that divides the cooling steam 38 into three streams 64, 65, and 66 and distributes these streams to pipes 144, 146, and 148.

Steam 64 is directed by pipes 144 from the manifold 140 to passages 150 formed in the inner shell 19. The passages 150 direct the steam 64 to the first row stationary vanes 180 and then through cooling passages 170 formed in the vanes. As shown, each cooling passage 170 has a simple U-shaped configuration. However, as will be readily appreciated by those skilled in the art, the cooling passages 170 can take a variety of forms, such as serpentine. As a result of flowing through the cooling passages 170, a portion of the heat that was transferred from the combustion steam 50 to the vanes 180 is transferred from the vanes 180 to the cooling steam 64, thereby cooling the vanes and heating the cooling steam. From the vane cooling passages 170 the now heated cooling steam 67 is directed by passages 152 to the plenum 120.

Similarly, pipes 146 and 148 direct steam 65 and 66, respectively, from the manifold 140 to passages 154 and 158, respectively, formed in the inner shell 19. The passages 154 and 158 direct the steam to passages 174 and 178, respectively, formed in the second and third rows of stationary vanes 182 and 184, respectively, thereby cooling the vanes. The now heated cooling steam 68 and 69 from the cooling passages 174 and 178, respectively, is the directed by passages 156 and 160, respectively, formed in the inner shell 19, to the plenum 120.

As shown in FIG. 2, from the plenum 120, the combined flow 44 of heated cooling steam 67, 68, and 69 is directed by the plenum past the ducts 126 and into the high pressure combustors 2 where, as previously discussed, the steam 44 serves to moderate temperature and cool the combustors.

Still referring to FIG. 2, and in a manner similar to that discussed above with respect to the high pressure vane cooling steam 38, the cooling steam 39 for the intermediate pressure vanes of the high pressure turbine 12 enters the outer shell 17 through a passage 112 and is directed by a pipe to a circumferentially extending pipe that forms a manifold located within the plenum 122. The manifold divides the cooling steam 39 into two streams 70 and 71 that are then distributed to pipes that direct them to passages in the inner shell 19 and eventually to cooling passages in the fourth and fifth row stationary vanes. Additional passages formed in the inner shell 19 direct the now heated cooling steam 72 and 73 from the vane cooling passages to the plenum 122. A passage 116 in the outer shell 17 directs the heated cooling steam 42 out of the plenum 122.

As previously discussed, the heated intermediate pressure vane cooling steam 42 is mixed with the steam 58 from the heat recovery steam generator 18 and then directed to the intermediate pressure turbine 14 where it provides further cooling.

In a manner similar to that discussed above with respect to the intermediate pressure vane cooling steam 39, the cooling steam 40 for the low pressure vanes of the high pressure turbine 12 enters the outer shell 17 through a passage 114 and is directed by a pipe to a circumferentially extending pipe that forms a manifold located within the plenum 124. The manifold divides the cooling steam 40 into two streams 74 and 75 that are then distributed to pipes that direct them to passages in the inner shell 19 and eventually to cooling passages in the sixth and seventh row stationary vanes. Additional passages formed in the inner shell 19 direct the now heated cooling steam 76 and 77 from the vane cooling passages to the plenum 124. A gap 125 formed between an outer flow guide 128 and the inner shell 19 directs the combined flow 43 of heated cooling steam streams 76 and 77 from the plenum 124 to the working fluid flow path where it mixes with the partially expanded steam 48 discharged from the high pressure turbine 12. As previously discussed, cooling steam stream 43 is subsequently further heated, and expanded steam stream 48 is subsequently reheated, in the intermediate pressure combustor 4.

The closed loop cooling system for the rotating blades will now be discussed. As shown in FIG. 2, the portion 36 of the cooling steam 32 from the heat recovery steam generator 18 enters the rotor 16 and flows axially upstream through a plurality of circumferentially distributed passages that form manifolds 130. Alternatively, the manifold 130 could be a single circular annular passage. The manifolds 130 distribute the cooling steam 36 to each of the rows of blades in the rotor 16 of the high pressure turbine 12.

Referring to FIG. 3, a portion 86 of the cooling steam 36 is directed by radially extending passages 162 formed in the rotor 16 from the manifolds 130 to the first row rotating blades 186 and then through cooling passages 172 formed in the blades. Bushings 190 prevent the cooling steam 86 from entering the manifold 134 directly. As shown, each cooling passage 172 has a simple U-shaped configuration. However, as will be readily appreciated by those skilled in the art, the cooling passages 172 can take a variety of forms, such as serpentine. As a result of flowing through the cooling passages 172, a portion of the heat that was transferred from the combustor steam 50 to the blades 186 is transferred from the blades to the cooling steam 86, thereby cooling the blades and heating the cooling steam. From the blade cooling passages 172 the now heated cooling steam 94 is directed by passages 164 to manifolds 134.

Similarly, the cooling steam 85 for the second row blades 188 flows through passages 166 and bushings 192 to cooling passages 176 formed in the second row blades 188. Passages 168 direct the now heated cooling steam 93 to the manifold 134. Returning to FIG. 2, in a similar manner, cooling 84 is provided to the third row blades. The combined flow 45 of heated cooling steam 92, 93, and 94 from the first three rows of blades is directed by the manifold 134 to the plenum 120. From the plenum 120, the high pressure blade cooling steam 45 is directed, along with the high pressure vane cooling steam 44, by the plenum past the ducts 126 and into the high pressure combustors 2 where, as previously discussed, the steam streams 44 and 45 serve to moderate temperature.

As also shown in FIG. 2, the rotor manifold 130 also distributes steam flows 80–83 to the fourth through seventh rows of rotating blades. The streams of heated cooling steam 87–90 from these rows is directed by a manifold 132 to a gap 127 formed between an inner flow guide 129 and the rotor 16. From the gap 127, the combined flow 78 of heated cooling steam from the low pressure blades of the high pressure turbine 12 is then directed to the working fluid flow path, where it mixes with the partially expanded steam 48 discharged from the high pressure turbine 12. As previously discussed, the low pressure blade cooling steam 78, along with the low pressure vane cooling steam 43, is subsequently further heated in the intermediate pressure combustor 4.

The closed loop high pressure turbine cooling system previously discussed permits very effective cooling, thereby enabling the expansion of very high temperature steam 50 (e.g., 1600° C.) in the high pressure turbine. Further, since essentially all of the cooling steam is returned to the cycle, the thermodynamic losses associated with prior vane and blade cooling schemes have been eliminated.

Although the present invention was discussed with reference to a high pressure turbine, the invention is also applicable to other turbines. Accordingly, the present invention may be embodied in other specific forms without departing from the spirit or essential attributes thereof and, accordingly, reference should be made to the appended claims, rather than to the foregoing specification, as indicating the scope of the invention.

We claim:

1. A method of generating rotating shaft power, comprising the steps of:
   a) combusting a first flow of hydrogen and a first flow of oxygen, thereby producing a first flow of steam;
   b) at least partially expanding said first flow of steam in a first turbine so as to produce shaft power and a flow of expanded steam, said first turbine having a plurality of components therein over which said first flow of steam flows, whereby heat is transferred from said first flow of steam to said components;
   c) transferring heat from said flow of expanded steam to a flow of feed water so as to generate a flow of cooling steam;
   d) directing at least a first portion of said flow of cooling steam through at least a first portion of said turbine components and transferring heat from said first portion of said turbine components to said first portion of said flow of cooling steam, thereby generating a first flow of heated cooling steam; and
   e) mixing said first flow of heated cooling steam with said first flow of steam; and
   directing a second portion of said flow of cooling steam through a second portion of said turbine components and transferring heat from said second portion of said turbine components to said second portion of flow of cooling steam, thereby generating a second flow of heated cooling steam.

2. The method according to claim 1, wherein the step of mixing said first flow of heated cooling steam with said first flow of steam comprises mixing prior to said expansion of said first flow of steam in said first turbine so as to transfer heat from said first flow of steam to said flow of heated cooling steam, thereby cooling said first flow of steam.

3. The method according to claim 1, further comprising the step of mixing said second flow of heated cooling steam with said flow of expanded steam prior to said transfer of heat from said flow of expanded steam to said flow of feed water.

4. The method according to claim 1, further comprising the steps of:
   a) combusting a second flow of hydrogen and a second flow of oxygen so as to produce a second flow of steam; and
   b) mixing said second flow of heated cooling steam with said second flow of steam so as to transfer heat from said second flow of steam to said second flow of heated cooling steam, thereby cooling said second flow of steam.

5. The method according to claim 4, further comprising the step of at least partially expanding said second flow of steam in a second turbine after said mixing of said second flow of heated cooling steam with said second flow of steam, thereby producing additional shaft power.

6. The method according to claim 1, wherein the step of mixing said first flow of heated cooling steam with said first flow of steam comprises mixing after said expansion of said first flow of steam in said first turbine.

7. The method according to claim 1, wherein said first flows of hydrogen and oxygen are combusted in a combustor, and wherein the step of mixing said first flow of heated cooling steam with said first flow of steam comprises directing said first flow of heated cooling steam to said combustor.

8. The method according to claim 1, wherein said first portion of said turbine components comprises a plurality of stationary vanes.

9. The method according to claim 1, wherein said first portion of said turbine components comprises a plurality of rotating blades.

10. The method according to claim 1, further comprising condensing said mixture of said first flow of heated cooling steam and said first flow of steam so as to produce said flow of feed water.

11. A power plant, comprising:
   a) a combustor having means for receiving and combusting a flow of hydrogen and flow of oxygen so as to produce a flow of combustion steam;
   b) a turbine having means for expanding said flow of combustion steam so as to produce a flow of expanded steam, said expanding means including a plurality of components over which said flow of combustion steam flows and to which said flow of combustion steam transfers heat;
   c) means for transferring heat from said flow of expanded steam to a flow of feed water so as to generate a flow of cooling steam;
   d) means for directing a first portion of said flow of cooling steam through at least a first portion of said turbine components and for transferring heat from said turbine components to said first portion of flow of cooling steam, thereby generating a first flow of heated cooling steam;
   e) means for directing said first flow of heated cooling steam to said combustor for mixing with said flow of combustion steam; and
   f) means for directing a second portion of said flow of cooling steam through at least a second portion of said turbine components and for transferring heat from said turbine components to said second portion of flow of cooling steam, thereby generating a second flow of heated cooling steam.

12. The power plant according to claim 11, wherein said first portion of said turbine components comprises a plurality of stationary vanes having cooling passages formed therein.

13. The power plant according to claim 12, wherein said turbine comprises a shell enclosing said turbine, and wherein said means for directing said first flow of heated cooling steam to said combustor comprises a plenum formed within said shell, said plenum being in flow communication with said combustor and said vane cooling passages.

14. The power plant according to claim 11, wherein said turbine comprises a rotor, and wherein said second portion of said turbine components comprises a plurality of rotating blades attached to said rotor and having cooling passages formed therein.

15. The power plant according to claim 14, wherein said means for directing said second flow of heated cooling steam to said combustor comprises a manifold formed within said rotor, said manifold being in flow communication with said combustor and said blade cooling passages.

16. A power plant, comprising:
   a) a combustor having means for receiving and combusting a flow of hydrogen and flow of oxygen so as to produce a flow of combustion steam;
   b) a turbine having means for expanding said flow of combustion steam so as to produce a flow of expanded steam, said expanding means including a plurality of components over which said flow of combustion steam flows and to which said flow of combustion steam transfers heat;

c) means for transferring heat from said flow of expanded steam to a flow of feed water so as to generate a flow of cooling steam;

d) means for directing at least a first portion of said flow of cooling steam through at least a first portion of said turbine components and for transferring heat from said turbine components to said first portion of flow of cooling steam, thereby generating a first flow of heated cooling steam;

e) means for directing said first flow of heated cooling steam to said flow of expanded steam for mixing therein; and f) means for directing a second portion of said flow of cooling steam through at least a second portion of said turbine components and for transferring heat from said turbine components to said second portion of flow of cooling steam, thereby generating a second flow of heated cooling steam.

17. The method of claim 1, further comprising the step of directing a third portion of said flow of cooling steam through a third portion of said turbine components and transferring heat from said third portion of said turbine components to said third portion of flow of cooling steam, thereby generating a third flow of heated cooling steam.

18. The method of claim 5, further comprising the steps of:

directing a third portion of said flow of cooling steam through a third portion of said turbine components and transferring heat from said third portion of said turbine components to said third portion of flow of cooling steam, thereby generating a third flow of heated cooling steam, and directing said third flow of heated cooling steam to said second turbine and transferring heat from components of said second turbine to said third flow of heated cooling steam thereby generating a flow of twice heated cooling steam.

19. The method of claim 18, further comprising the step of mixing said flow of twice heated cooling steam with said second flow of steam so as to transfer heat from said second flow of steam to said flow of twice heated cooling steam, thereby cooling said second flow of steam.

20. The power plant of claim 11, further comprising:

a) a second combustor having means for receiving and combusting a second flow of hydrogen and a second flow oxygen so as to produce a second flow of combustion steam; and b) means for directing said flow of expanded steam to said second combustor.

21. The power plant of claim 20, further comprising:

a) means for directing said second flow of heated cooling steam to said second combustor for mixing with said second flow of combustion steam.

22. The power plant of claim 21, wherein said turbine comprises a first turbine, and further comprising:

a) a second turbine;

b) means for directing said second flow of combustion steam to said second turbine.

23. The power plant of claim 22, further comprising:

a) means for directing a third portion of said flow of cooling steam through at least a third portion of said first turbine components and for transferring heat from said first turbine components to said third portion of flow of cooling steam, thereby generating a third flow of heated cooling steam; and b) means for directing said third flow of heated cooling steam to said second turbine and transferring heat from components of said second turbine to said third flow of heated cooling steam thereby generating a flow of twice heated cooling steam.

24. The power plant of claim 23, further comprising a means for directing said flow of twice heated cooling steam to said second combustor.

25. The power plant of claim 16, further comprising a means for directing said second flow of heated cooling steam to said combustor for mixing with said flow of combustion steam.

* * * * *